US010884785B2

(12) United States Patent
Nilsen

(10) Patent No.: US 10,884,785 B2
(45) Date of Patent: Jan. 5, 2021

(54) PRECISE ACCOUNTING OF PROCESSOR TIME FOR MULTI-THREADED TIME-CRITICAL APPLICATIONS

(71) Applicant: International Business Machines Corporation, Armonk, NY (US)

(72) Inventor: Kelvin D. Nilsen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/203,735

(22) Filed: Nov. 29, 2018

(65) Prior Publication Data

US 2020/0174827 A1 Jun. 4, 2020

(51) Int. Cl.
G06F 9/48 (2006.01)
G06F 9/30 (2018.01)

(52) U.S. Cl.
CPC .......... *G06F 9/4837* (2013.01); *G06F 9/3009* (2013.01); *G06F 9/30079* (2013.01); *G06F 9/30087* (2013.01); *G06F 9/485* (2013.01); *G06F 9/4881* (2013.01)

(58) Field of Classification Search
CPC .................................................... G06F 9/4837
See application file for complete search history.

(56) References Cited

U.S. PATENT DOCUMENTS

| 6,438,573 | B1 | 8/2002 | Nilsen | |
|---|---|---|---|---|
| 6,466,962 | B2 | 10/2002 | Bollella | |
| 8,069,444 | B2 | 11/2011 | Fedorova | |
| 8,195,922 | B2 | 6/2012 | Chen et al. | |
| 2005/0132038 | A1* | 6/2005 | Inoue | G06F 9/4887 709/223 |
| 2007/0067771 | A1* | 3/2007 | Kulbak | G06F 9/4843 718/100 |
| 2014/0281088 | A1 | 9/2014 | VanderLeest et al. | |
| 2015/0277985 | A1* | 10/2015 | Abraham | G06F 9/45533 718/1 |

OTHER PUBLICATIONS

Gracon et al., *A high performance computing system for time critical applications*, Fall Joint Computer Conference, Nov. 1971, pp. 549-560, ACM New York, DOI: 10.1145/1479064.1479163.

(Continued)

*Primary Examiner* — Sisley N Kim
(74) *Attorney, Agent, or Firm* — Peter J. Edwards

(57) ABSTRACT

Methods and apparatus for processor time accounting for a thread executing in a multi-threaded environment are disclosed. A thread executing in an operating system receives from an operating system an allotment of time for use of a processor, and performs timed computations using the processor. Iteratively or after completing the computations, the thread determines an amount of time used by the thread based on a thread utilization counter initialized by the operating. The thread makes this determination through a user-level library function call rather than a call to the operating. The thread obtains an amount of time remaining in the allotment of time by comparing the thread utilization counter to a current CPU time using a user-level library function call.

20 Claims, 8 Drawing Sheets

(56) References Cited

OTHER PUBLICATIONS

Serlin, *Scheduling of time critical processes*, Proceedings, AFIPS Spring Joint Computing Conference, May 1972, pp. 925-932, ACM New York, DOI: 10.1145/1478873.1478995.

Anonymous, *A Test and Diagnostic Mechanism for a CPU Scheduler in a Middleware Software System*, An IP.com Prior Database Technical Disclosure, Nov. 2012, 6 pages, IP.com (online), IPCOM000223701D.

Anonymous, *Method for Optimizing Performance of Multithreaded Applications using Automatic Tuning of the IBM AIX OS*, An IP.com Prior Art Database Technical Disclosure, Mar. 2010, 6 pages, IP.com (online), IPCOM000193790D.

Nilsen, *Modernizing the Real-Time and Embedded Curriculum*, Proceedings of the International Conference on Frontiers in Education: Computer Science and Computer Engineering, Jul. 2012, 5 pages, online, <<https://worldcomp-proceedings.com/proc/p2012/FEC3056.pdf>>.

Nilsen, *Adding Real-Time Capabilities to Java*, Communications of the ACM, Jun. 1998, vol. 41, No. 6, pp. 49-56, ACM New York.

\* cited by examiner

801 → *< Perform ISR prologue as if no precise CPU time accounting. >*
802 → gtaua ry;
803 → current_thread->application_utilization_alarm = ry;
804 → rx = this_ISR->system_cpu_time;
805 → rz = rx + ISR_PROLOGUE_CPU_TIME;
806 → stur ry, rz
807 → rz = ry - ISR_PROLOGUE_CPU_TIME;
808 → current_thread->user_cpu_time = rz;;
809 → stura rx;
810 → staua rx;
811 → *< Check for pending interrupts.>*
812 → *<Service the interrupt.>*
813 → rx = current_thread->user_cpu_time;
814 → ry = rx - ISR_EPILOGUE_CPU_TIME;
815 → stur rz, ry
816 → this_ISR->system_cpu_time = rz + ISR_EPILOGUE_CPU_TIME;
817 → rx = current_thread->thread_utilization_allotment_timeout;
818 → stura rx
819 → rx = current_thread->application_utilization_alarm;
820 → staua rx
821 → *<Check for pending interrupts>*
822 → *< Perform ISR epilogue as if no precise CPU time accounting. >*

FIG. 8

PRECISE ACCOUNTING OF PROCESSOR TIME FOR MULTI-THREADED TIME-CRITICAL APPLICATIONS

BACKGROUND

Field of the Invention

The field of the invention is data processing, or, more specifically, methods, apparatus, and products for precise accounting of processor time for multi-threaded time-critical applications.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

While many enterprises own and maintain their own computing equipment, some lease time on a non-owned computer. That is, rather than own and operate a large-frame computer such as a server, or a high-performance computer such as a supercomputer, an enterprise will simply lease a third-party's computer for the amount of time that computing power is needed. Such leases typically are charged for real-time usage (also known as "wall clock time."). That is, the lessee is charged for the amount of real time (seconds, minutes, hours) that they are actually using the computer. If the lessee were leasing time on a dedicated machine, time accounting is simple. However, if the lessee is leasing computer time on a multi-thread machine that is handling multiple-lessee's work, the time accounting becomes more complicated.

Further, with the introduction of simultaneous multi-threading (SMT), simple use of the timekeeping hardware in the processor is no longer sufficient because the SMT mechanism allocates processing resources to competing hardware threads on a very fine-grained basis, for example, at each instruction dispatch cycle in the processor.

Thus, when designing applications that execute in these cloud computing environments, it is incumbent upon the application programmer to design software that will execute as efficiently as possible. Such a programmer would prefer a system in which time allotments may be monitored and readily ascertained. While per-thread time accounting may be implemented by applications through calls to the operating system, these calls consume valuable time and are therefore ineffective for use in precise time accounting by the SMT thread.

Additionally, a characteristic of real-time computing and time-critical systems that makes development, testing, debugging, and incremental refinement very difficult is that timing errors in one component can have far-reaching impact. For example, component A may still satisfy all of its timing constraints even if some of its tasks consume more CPU time than was assumed during scheduling analysis. However, some other component Z may fail to satisfy its timing constraints because component A used some of the CPU time that was assumed to have been available to component Z.

SUMMARY

This invention provides new instructions to enable strong separation of concerns between independently developed time-critical software components. Like memory protection hardware, which protects one component's memory from being accessed by other components, this hardware support assures that CPU time allotted to one time-critical component will not be consumed by other software components.

An embodiment of the present invention is directed to a method of processor time accounting for a thread executing in a multi-threaded environment receiving from an operating system an allotment of time for use of the processor, performing timed computations using the processor, determining an amount of time used by the thread based on a thread utilization counter that is initialized by the operating system and is incremented in proportion to the number of machine cycles executed by the thread, wherein the determination is made through a user-level library function call, and obtaining an amount of time remaining in the allotment of time by comparing the thread utilization counter to a current processor time allotment limit value through a user-level library function call.

Another embodiment of the present invention is directed to an apparatus for processor time accounting for a thread executing in a multi-threaded environment, the apparatus comprising a computer processor, a computer memory operatively coupled to the computer processor, the computer memory having disposed within it computer program instructions that, when executed by the computer processor, cause the apparatus to carry out the steps of, by a thread, receiving from an operating system an allotment of time for use of the processor, performing timed computations using the processor, determining an amount of time used by the thread based on a thread utilization counter that is initialized by the operating system and is incremented in proportion to the number of machine cycles executed by the thread, wherein the determination is made through a user-level library function call, and obtaining an amount of time remaining in the allotment of time by comparing the thread utilization counter to a current processor time allotment limit value through a user-level library function call.

Another embodiment of the present invention is directed to a computer program product for processor time accounting for a thread executing in a multi-threaded environment, the computer program product disposed upon a computer readable medium, the computer program product comprising including receiving from an operating system an allotment of time for use of the processor, performing timed computations using the processor, determining an amount of time used by the thread based on a thread utilization counter that is initialized by the operating system and is incremented in proportion to the number of machine cycles executed by the thread, wherein the determination is made through a user-level library function call, and obtaining an amount of time remaining in the allotment of time by comparing the thread utilization counter to a current processor time allotment limit value through a user-level library function call.

Various embodiments of the present invention may additionally include setting an alarm to trigger at a time that is less than the allotment of time through a user-level library function call, performing timed computations using the processor while waiting for the alarm to trigger, interrupting the timed computations when the alarm is detected, and determining whether additional computations can be completed in the time remaining in the allotment of time.

Various embodiments of the present invention may additionally include setting an alarm to trigger at a time that is less than the allotment of time through a user-level library function call, performing timed computations using the processor while waiting for the alarm to trigger, obtaining an amount of time remaining before the alarm will trigger through a user-level library function call, and when additional timed computations cannot be completed before the alarm is triggered, abandoning the timed computations and turning off the alarm through a user-level library function call, and determining whether additional computations can be completed in the time remaining in the allotment of time.

Various embodiments of the present invention may additionally include comparing the amount of time remaining in the allotment of time against the time required to perform additional computations, if any, and determining that there are no additional computations to be performed within the time remaining in the allotment time, saving the context of the thread, and yielding any time remaining in the allotment of time to the operating system.

In various embodiments of the present invention, a rate at which the thread utilization counter is incremented is adjusted in proportion to dynamic adjustments to an underlying processor clock frequency.

In various embodiments of the present invention, when receiving an interrupt from the operating system, a thread context is saved and the time remaining in the allotment of time granted is preserved.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 8 is a diagram of exemplary instructions for executing a method for precise accounting of processor time for multi-threaded time-critical applications according to embodiments of the present invention.

DETAILED DESCRIPTION

As described herein, embodiments in accordance with the present invention provide abstractions for precise accounting of CPU time in multithreaded computing that are missing from current practice that would be particularly useful to time-critical developers. The following provides systems and methods that may, for example, efficiently obtain a very precise tally of how much CPU time is being consumed by a particular thread; arrange that thread T receive a CPU time allotment of 350 microseconds during each second of wall clock time; query to determine how much CPU time remains in the running thread's current CPU time allotment; request that the current thread receive an alarm signal after 80 microseconds of execution time; given that a watchdog alarm is scheduled to be signaled at CPU time X if certain actions are not completed prior to time X, request that the alarm be delivered instead at time X−delta in order to perform delta CPU time units of cleanup work prior to handling the alarm signal; and yield the remainder of the current CPU time allotment and suspend the thread until it receives a new CPU time allotment.

Embodiments of the present invention make it easier to reliably integrate independently developed time-critical software components. Each component is responsible for determining its requirements for periodic allotments of execution time. The component communicates its scheduling requirements to the operating system, and the operating system pre-allocates the associated resources. If there are not sufficient resources to satisfy the component's request, this is communicated to the component when it first attempts to install itself into the time-critical workload. Note that an operating system's commitment of periodic CPU time allotments to a time-critical workload may constrain subsequent decisions to down-scale CPU clock rates on certain cores.

Exemplary methods, apparatus, and products for precise accounting of processor time for multi-threaded time-critical applications in accordance with the present invention are described with reference to the accompanying drawings, beginning with FIG. 1.

Figure 1:
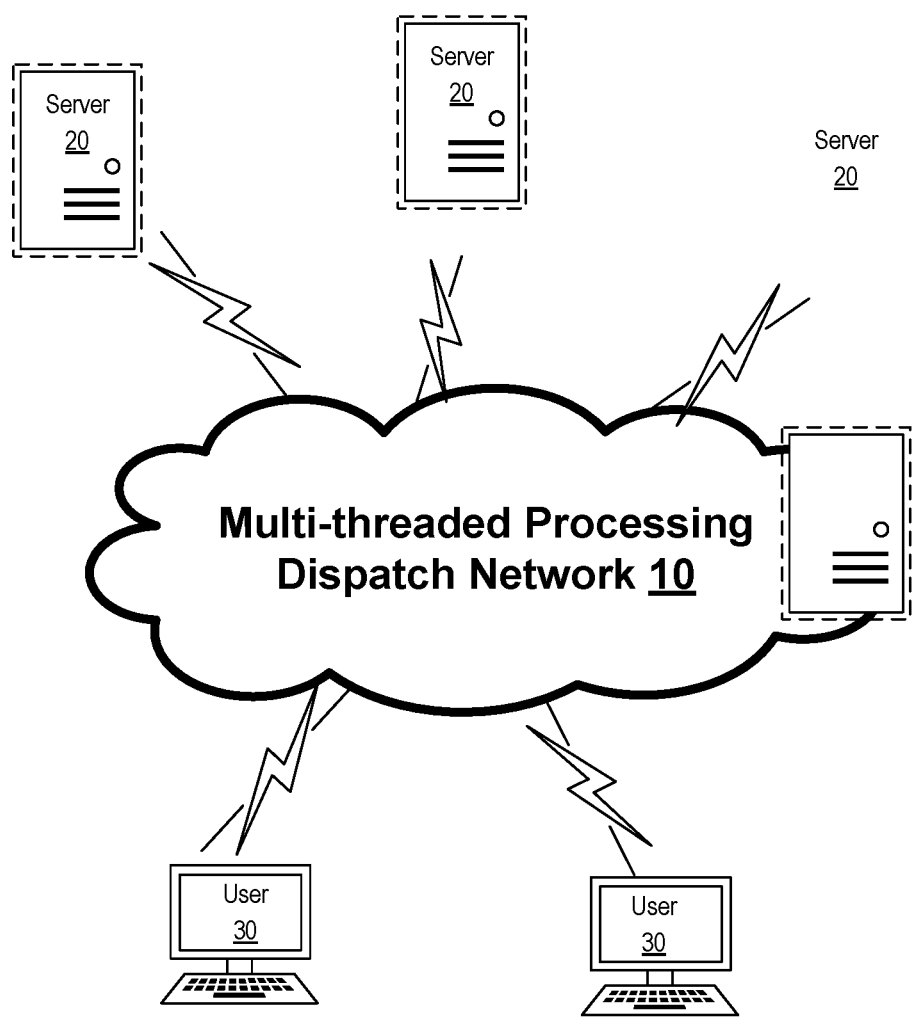
FIG. 1 is a high-level diagram of an exemplary network in accordance with embodiments of the present invention.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Users 30 access one or more servers 20 through a multi-threaded dispatch network 10. The servers 30 may be virtual servers, and may logically comprise a plurality of processing units. Application threads of the users 30 may be dispatched to the servers 20 through the dispatch network.

Precise accounting of processor time for multi-threaded time-critical applications in accordance with the present invention is generally implemented with computers, that is, with automated computing machinery. In the system of FIG.

1, for example, all the threads, operating systems, thread time accounting modules, and operating system time accounting modules are implemented to some extent at least as computers. For further explanation, therefore, FIG. 2 sets forth a block diagram of automated computing machinery comprising an exemplary computer (152) configured for precise accounting of processor time for multi-threaded time-critical applications according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a time accounting module (305), a module of computer program instructions for, at least, setting an alarm corresponding to an allotted amount of CPU time consumed by a thread. Also stored RAM (168) is a time accounting libraries module (313), a module of computer program instructions for providing library services for implementing CPU time accounting by the thread. Also stored in RAM (168) is an OS time accounting module (308), a module of computer program instructions improved for precise accounting of processor time for multi-threaded time-critical applications according to embodiments of the present invention.

Also stored in RAM (168) is an operating system (154). Operating systems useful in computers configured for precise accounting of processor time for multi-threaded time-critical applications according to embodiments of the present invention include UNIX™, Linux™ Microsoft XP™, AIX™, IBM's i5/OS™, and others as will occur to those of skill in the art. The operating system (154), OS time accounting module (308), thread (303), thread time accounting module (305), and time accounting libraries module (313) in the example of FIG. 2 are shown in RAM (168), but many components of such software typically are stored in non-volatile memory also, such as, for example, on a disk drive (170).

Figure 2:
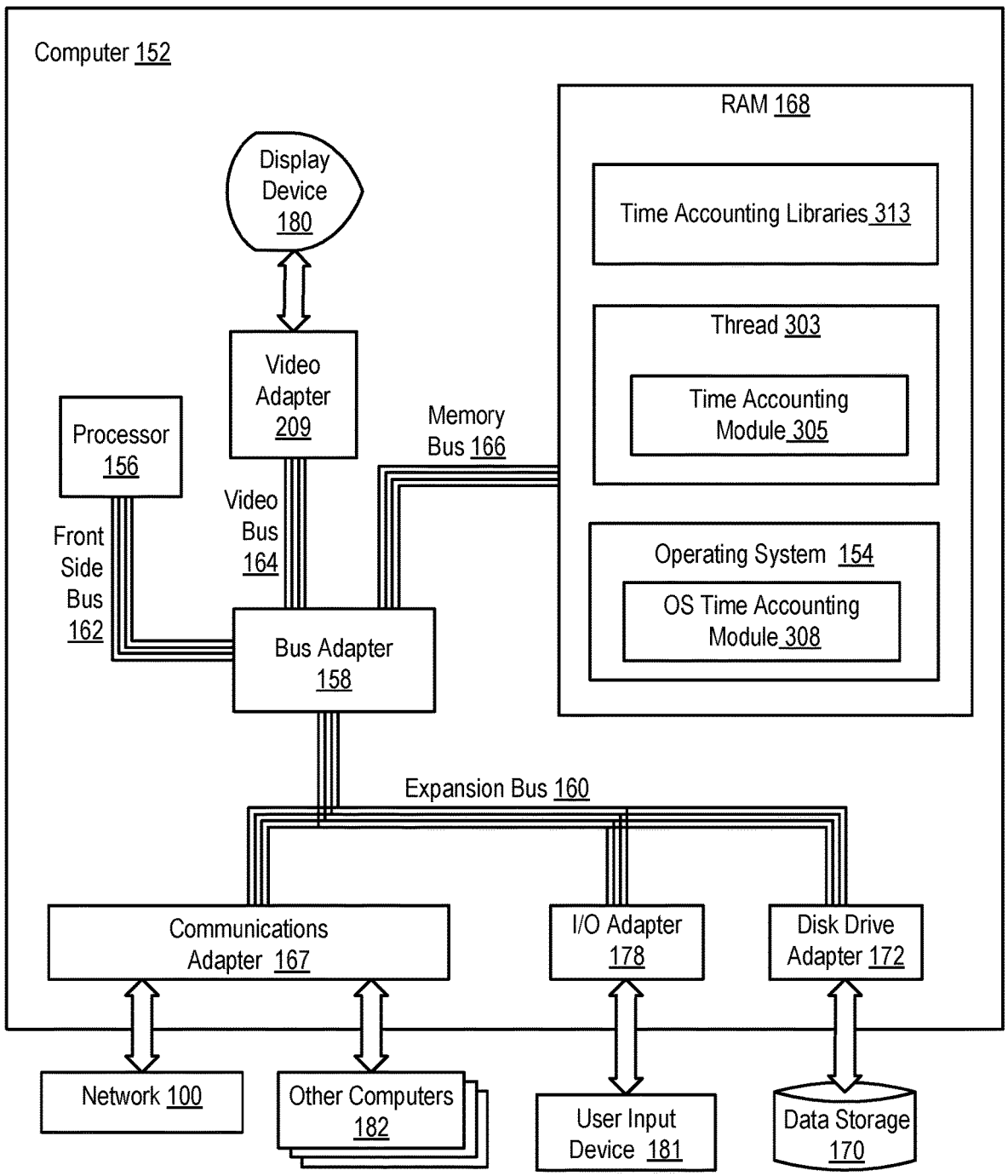
FIG. 2 is a high-level diagram of a computer system in which embodiments of the invention may be implemented.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for precise accounting of processor time for multi-threaded time-critical applications according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for precise accounting of processor time for multi-threaded time-critical applications according to embodiments of the present invention include modems for wired dial-up communications, Ethernet (IEEE 802.3) adapters for wired data communications, and 802.11 adapters for wireless data communications.

Figure 3:
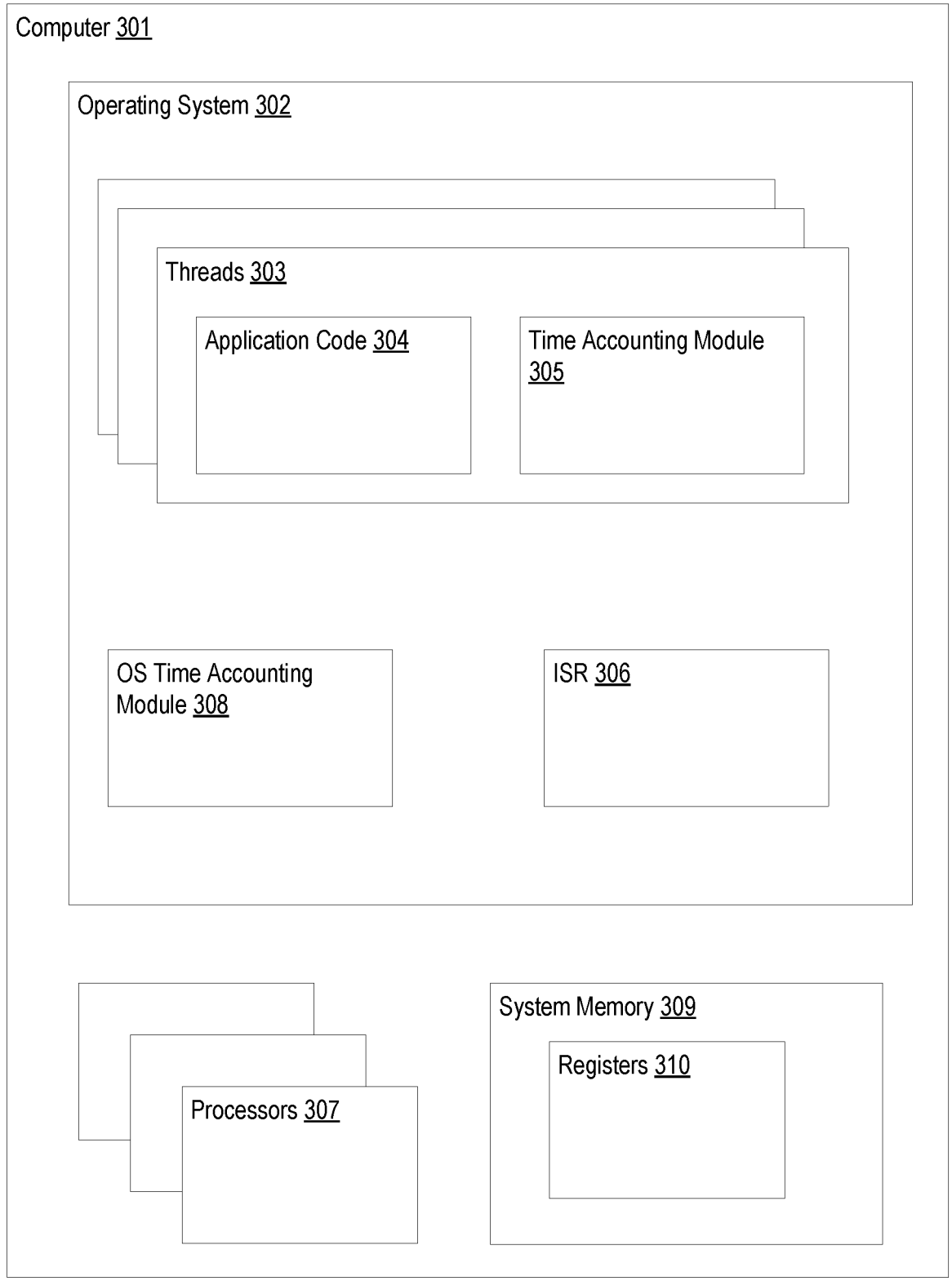
FIG. 3 is a high-level diagram of an exemplary computer in accordance with embodiments of the present invention.

For further explanation, FIG. 3 sets forth an architecture diagram of a system configured for precise accounting of processor time for multi-threaded time-critical applications according to embodiments of the present invention. The system of FIG. 3 includes a computer 301 that includes an operating system 302 and one or more processors 307 for executing application instructions, as well as a system memory 309 with registers 310. The operating system 302 may executing one or more threads 303. In addition to application code 304, the thread may include a time accounting module 305 for performing processor time accounting for the thread 303. The operating system may further include a time accounting module 308 for accounting for processor time used by the threads 303, as well as one or more interrupt service routines (ISR) 306.

Figure 4:
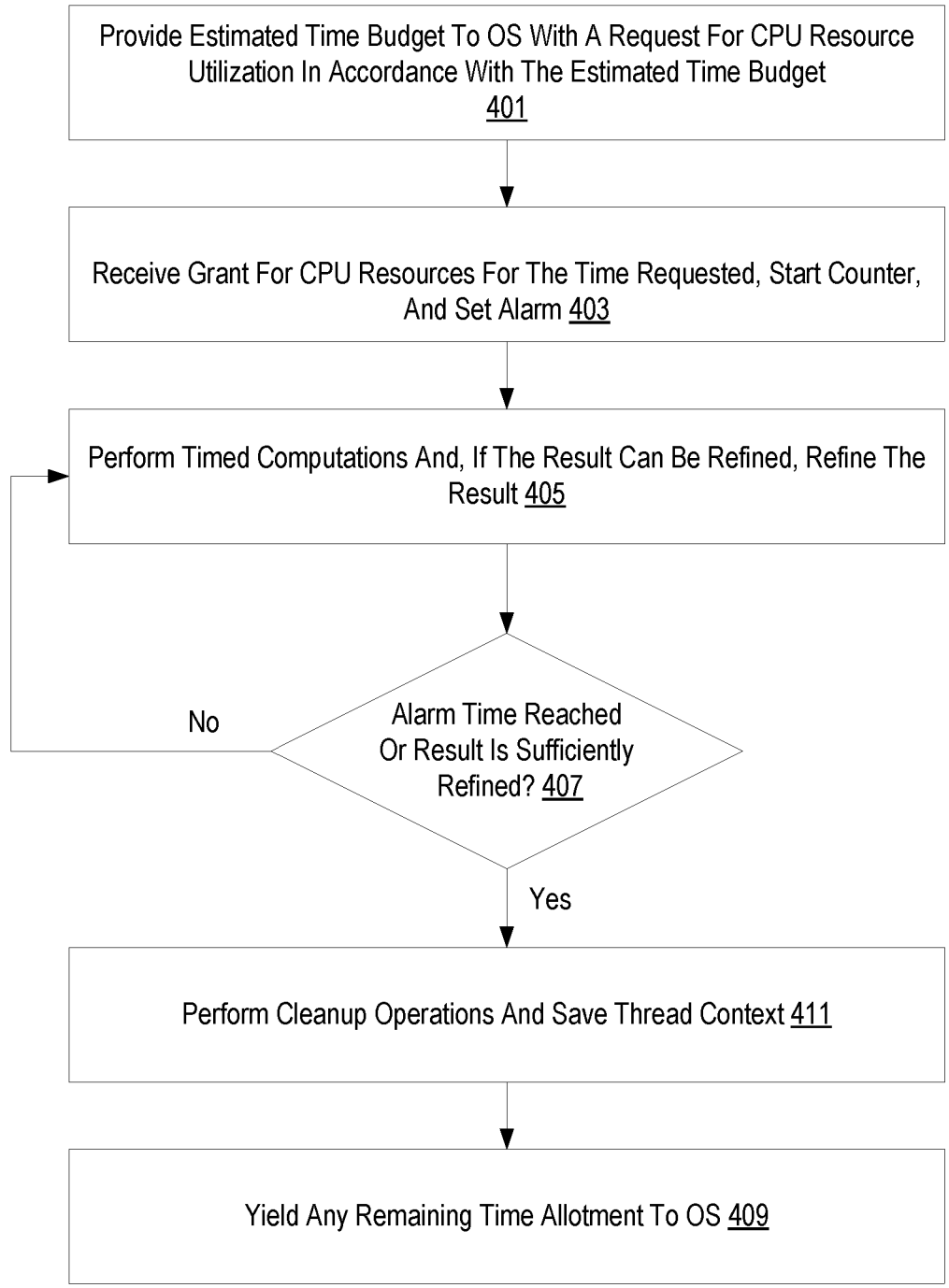
FIG. 4 is a flow chart illustrating a method for precise accounting of processor time for multi-threaded time-critical applications according to embodiments of the present invention.

For further explanation, FIG. 4 sets forth a flow chart illustrating an exemplary method for precise accounting of processor time for multi-threaded time-critical applications according to embodiments of the present invention that includes a method of implementing a self-imposed time limit of processor resources by a thread executing within the OS.

In FIG. 4 resource time-management of a processor, or CPU, is implemented by a time-critical thread, or SMT thread, in a multi-threaded application by imposing on itself a time limit of CPU resources. From prior experimentation and statistical analysis, an estimated amount of CPU time for the thread to complete an operation has been derived. The thread provides at 401 an estimated time budget to the OS with a request for CPU resource utilization in accordance with the time budget provided to the OS. Having been granted by the OS the CPU resources for the time requested at 403, the thread begins counting the CPU time that is used, and further instantiates an "alarm" for an amount of CPU time that is less that the allotted amount of CPU time. By way of example and not limitation, the time-critical thread may request and receive 350 ms of CPU time, and set an alarm that signifies a cut-off time of 80 ms of CPU time left to complete the operation. The time-critical thread attempts to complete the timed computations during the allotted time at 405. While more time is necessary to complete or continue to refine the result of the operation and the alarm time has not yet been reached at 407, the time-critical thread continues the time computations and/or refinements at 405. If the time-critical thread completes the operation and/or arrives at a satisfactory result at 407, the thread saves the context of the operation in the available registers at 411 and yields the remaining CPU time to the OS at 409. If a satisfactory result has not been achieved and the alarm time has been reached at 407, the thread uses the remaining CPU time of the allotted CPU time to save the context of the operation in the available registers and complete any context clean-up in the operation at 411, and then yield the remaining CPU time, if any, to the OS at 409. The time-critical thread creates the self-imposed time limit because it is known that the OS will interrupt the thread at the end of the allotted CPU time so that CPU resources may be transferred to another thread.

For the purposes of example and not limitation, pseudo-code that implements the method of implementing a self-imposed time limit of processor resources by a thread executing within the OS, as illustrated in FIG. 4, is provided below. In the following example, a time-critical thread attempts to refine an answer only if there is sufficient CPU time remaining in the current allotment:

```
time_critical_result = initialEstimate ( );
if (PreciseCPUTime.remainingAllotment ( ) > CostToImproveResult)
    time_critical_result = improveResult (time_critical_result);
PreciseCPUTime.yieldRemainingAllotment ( );
```

The code sequence below demonstrates the use of an application thread's self-imposed CPU time limit with an algorithm that makes iterative refinement to an initial approximation:

```
time_critical_result = initialEstimate ( );
long time_budget = PreciseCPUTime.remainingAllotment ( );
try {
   /* Set alarm to throw CPUTimeAlarmException. */
   PreciseCPUTime.alarm (time_budget - CostToWrapUp);
   while (!estimateIsGoodEnough (time_critical_result))
      time_critical_result = refineResult (time_critical_result);
} catch (CPUTimeAlarmException a) { /* do nothing */ }
finally { PreciseCPUTime.alarm (0);/* turn off the alarm */ }
doWrapUp ( );
PreciseCPUTime.yieldRemainingAllotment ( );
```

Figure 5:
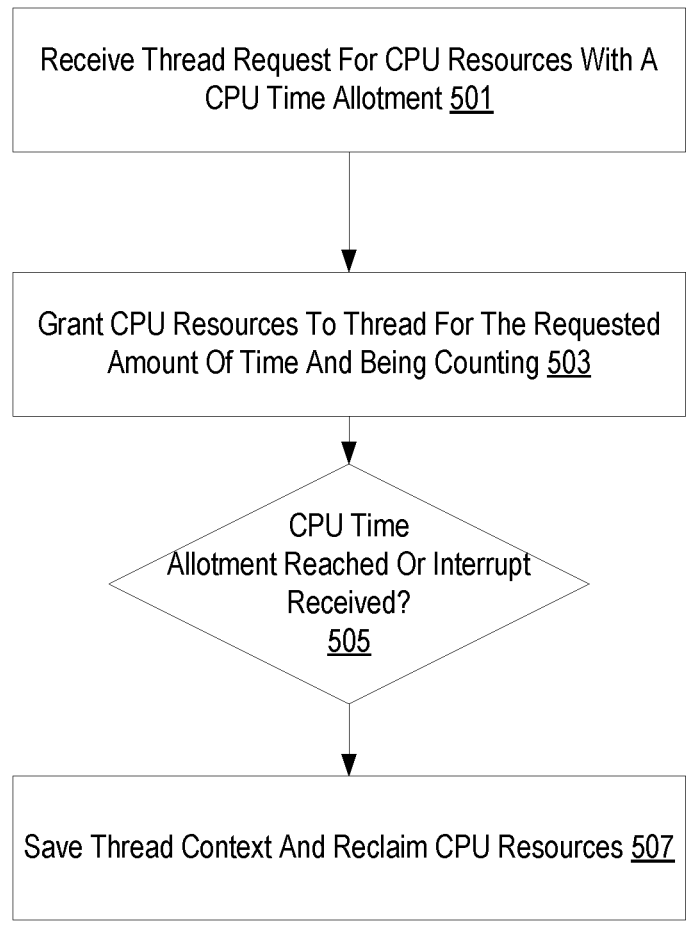
FIG. 5 is a flow chart illustrating a method for precise accounting of processor time for multi-threaded time-critical applications according to embodiments of the present invention.

For further explanation, FIG. 5 sets forth a flow chart illustrating a further exemplary method for precise accounting of processor time for multi-threaded time-critical applications according to embodiments of the present invention that includes a method of enforcing CPU time limits on an executing thread by the OS.

Referring to FIG. 5, the OS operations for imposing CPU resource time limits on a thread are illustrated. The OS receives a request for CPU time from the time-critical SMT thread at 501. Presuming CPU resources are available, at 503 the OS allocates the CPU resources to the SMT thread and sets a timer at which point resources allocated to the SMT thread will be reclaimed. Once the timer expires for the SMT thread at 505, the OS reclaims the CPU resources from the SMT thread and reallocates resources to other SMT threads in the pipeline at 507.

Figure 6:
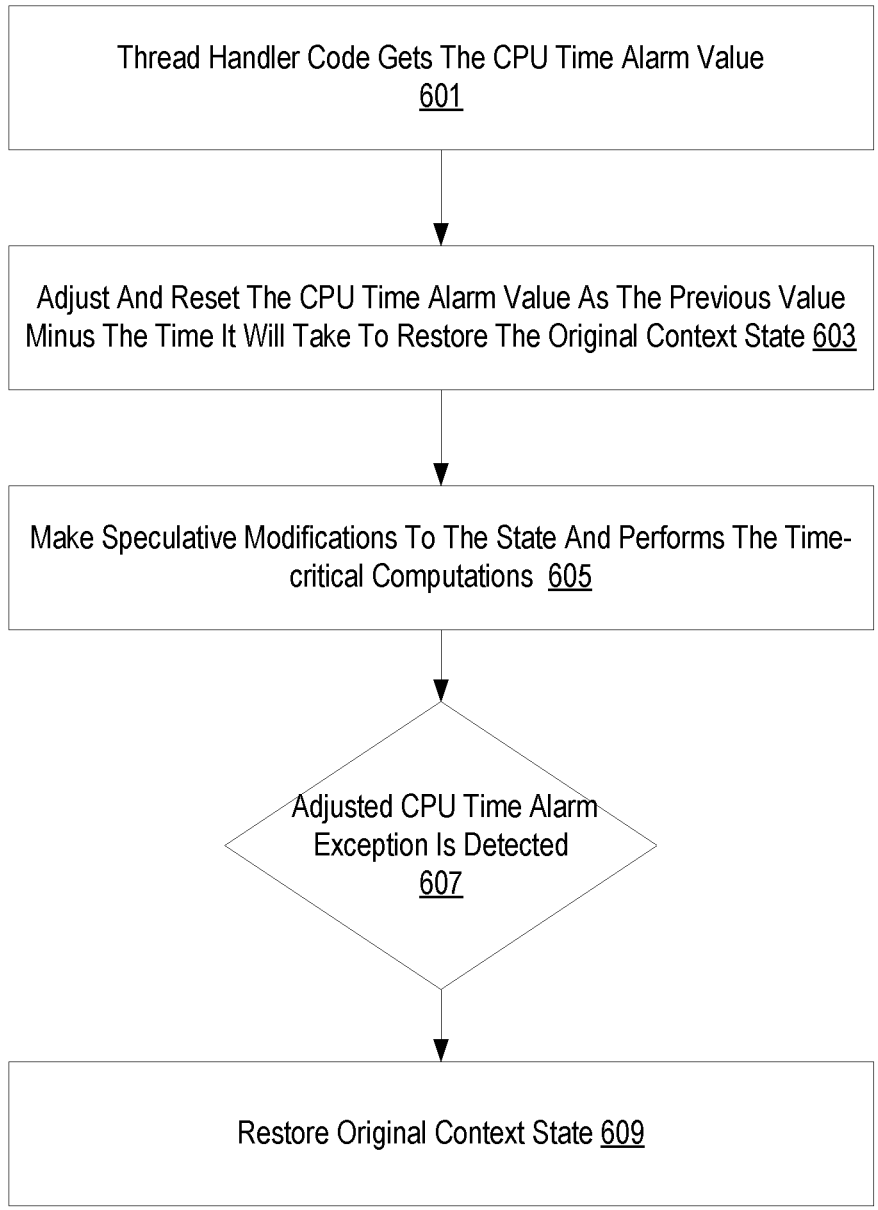
FIG. 6 is a flow chart illustrating a method for precise accounting of processor time for multi-threaded time-critical applications according to embodiments of the present invention.

For further explanation, FIG. 6 sets forth a flow chart illustrating a further exemplary method for precise accounting of processor time for multi-threaded time-critical applications according to embodiments of the present invention that includes a method in which a thread would handle context clean-up operations within a context in the application.

When code that executes within a context that is guarded by a CPU time alarm requires a large amount of time to restore state in the case that the computations are aborted by an alarm, the alarm should be advanced by enough time to allow this code to clean up the changes it made speculatively to shared state before the time-out exception is delivered to the enclosing context.

Figure 7:
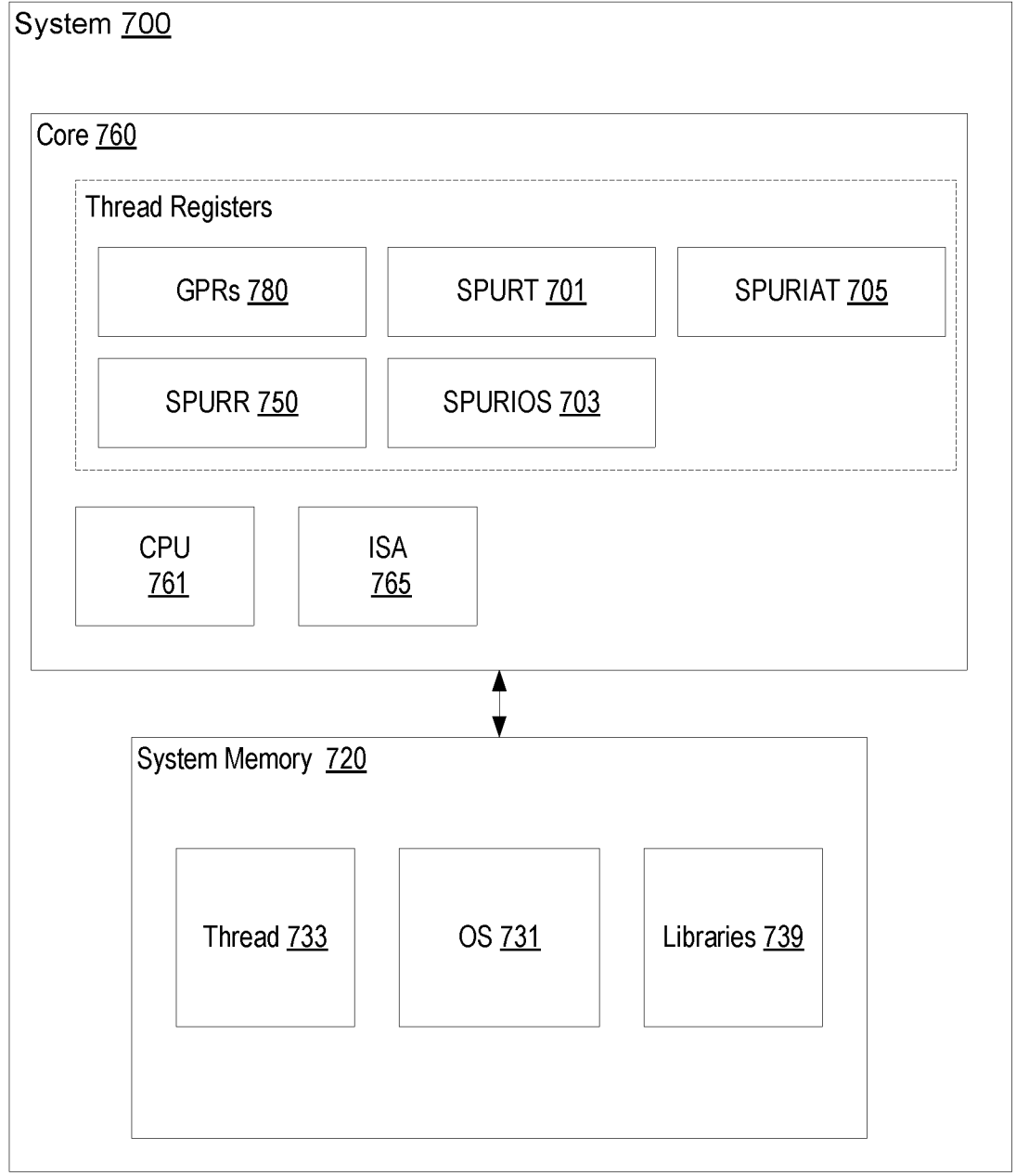
FIG. 7 is a high-level diagram of a system for precise accounting of processor time for multi-threaded time-critical applications according to embodiments of the present invention.

Referring to FIG. 6, a method in which an SMT thread would handle context clean-up operations within a context is shown. In FIG. 7, the SMT thread handler code gets the CPU time alarm value at 601 and adjusts and resets the CPU time alarm value as the previous value minus the time it will take to restore the original context state at 603. The SMT thread then makes speculative modifications to the state and performs the time-critical computations at 605 unless the adjusted CPU time alarm exception is detected at 607. If the adjusted CPU time alarm is detected at 607, the original context state is restored at 609.

By way of example and not limitation, pseudocode in which an SMT thread would handle context clean-up operations within a context as described in FIG. 6 is provided below:

```
boolean timeout_detected = false;
try {
   long original_timeout = PreciseCPUTime.alarmTime ( );
   PreciseCPUTime.alarm (original_timeout -
   TimeToRestoreOriginalState);
   speculativelyModifyState ( );
   doTimedComputations ( );
   /* If completes with no timeout, keep the speculatively modified
   state. */
} catch (CPUTimeAlarmException a) {
   restoreOriginalState ( ); timeout_detected = true; throw a;
} finally {
   if (!timeout_detected) PreciseCPUTime.alarm (original_timeout);
}
```

For further explanation, FIG. 7 sets forth a diagram of a system for precise accounting of processor time for multi-threaded time-critical applications according to embodiments of the present invention that includes four special purpose registers for implement the accounting.

The system 700 is an exemplary architecture in which precise accounting of processor time for multi-threaded time-critical applications according to embodiments of the present invention may operate. The system 700 includes a system memory 720 in which is provided an OS 731 and one or more SMT threads 733 that compete for processor resources, particularly CPU time. The OS 731 controls the access that each thread 733 has to the processor core 760. The system memory 720 further include a library module 739 containing user-level and kernel level function definitions for implementing the precise time accounting of processor time for multi-threaded time critical applications in accordance with embodiments of the present invention. The processor core further includes at least one CPU 761 and an ISA module 765 in accordance with embodiments of the present invention.

Each SMT thread 733 of core 760 of the architecture includes a scaled processor utilization of resources register, referred to herein as a scaled processor utilization of resources register (SPURR) 750. The value held in the SPURR register 750 is approximately proportional to the number of CPU time cycles consumed by the SMT thread 733 on that core. The unscaled rate at which the SPURR register 750 increments may be estimated as the same increment rate as the underlying computer's timebase rate, 512 MHz on typical computers. If the core's clock rate is slowed to reduce power consumption or processor overheating, the SPURR register 750 increment oscillator is scaled downward proportionately. Furthermore, the SPURR register 750 increment rate is also scaled downward by dividing the unscaled increment rate by the number of SMT threads that share access to the same core. While using the SPURR register 750 to represent precise consumption of CPU time by individual SMT threads is appropriate, the SPURR register 750 in existing implementations of the CPU architecture is a privileged resource that may only be viewed or modified by the hypervisor or OS. Accordingly, use of the SPURR register 750 for individual thread CPU time accounting is costly and inefficient because reading the current value of the SPURR register 750 requires a privileged system call. Furthermore, the value held in the SPURR register in existing implementations of an OS running on top of a hypervisor is unreliable because an OS running within a logical partition is not necessarily aware of preemption of itself by an underlying hypervisor. Thus, certain increments of the SPURR register 750 tally may be inappropriately attributed to the wrong software component. For these reasons, embodiments of the present invention include additional special purpose registers and additional special instructions in the architecture that are used to implement CPU time accounting by individual SMT threads 733 and by an OS 731 running within a particular logical partition.

Three special purpose registers are used to implement CPU time accounting by individual SMT threads 733 and the OS 731 in a particular logical partition. The follow set of registers are maintained for each thread's execution context.

A scaled processor utilization of resources thread adjustment (SPURT) register 701 is a 64-bit delta representing the accumulation of SPURR register 750 counts that have been consumed outside of the currently running SMT thread 733. Conceptually, this is a negative number that is added to the current SPURR register 750 count to obtain the amount of CPU time consumed by the current SMT thread.

A scaled processor utilization of resources interval for operating system (SPURIOS) register 703 is a 64-bit value representing the CPU time at which an interrupt will be triggered to mark the end of the currently running SMT thread's CPU time allotment. The interrupt is raised when the value of the SPURR 750 register equals the value of SPURIOS register 703. To effectively disable the services, the SPURIOS register 703 is set to a value in the recent past.

A scaled processor utilization of resources interval for application thread (SPURIAT) register 705 is a 64-bit value representing the CPU time at which an interrupt will be triggered to mark exhaustion of an application thread's self-imposed CPU time allotment. The interrupt is raised when the value of the SPURR register 750 equals the value of SPURIAT register 705. To effectively disable the service, the SPURIAT register 705 is set to a value in the recent past.

In accordance with embodiments of the present invention, an instruction set architecture defines additional instructions that are provided in the Instruction Set Architecture (ISA) 765 to provide access to the SPURT register 701, the SPURIOS register 703, and the SPURIAT register 705. One or more general purpose registers (GPR) 780 are also used in the implementation of the instructions. Unless otherwise noted, the instructions defined below may be executed by the application, the OS, or a hypervisor:

Get Thread Utilization of Resources
gtur XT
GPR[XT]=SPURR+SPURT;
Set Thread Utilization of Resources (privileged to OS and hypervisor)
stur XT, XA
GPR[XT]=SPURR+SPURT;
SPURT=GPR[XA]−SPURR;
Set Thread Utilization of Resources Allotment (privileged to OS and hypervisor)
stura XA
SPURIOS=GPR[XA]−SPURT;
Get Thread Utilization of Resources Allotment
gtura XT
GPR[XT]=SPURIOS+SPURT;
Set Thread Application Utilization Alarm
staua XA
SPURIAT=GPR[XA]−SPURT;
Get Thread Application Utilization Alarm Value
gtaua XT
GPR[XT]=SPURIAT+SPURT;

While an operating system may provide services that a thread may use for CPU time accounting, invoking an operating system service is typically much more costly (100 times more costly in typical scenarios) than invoking a library function. This is because the implementation of an operating system service involves changing the protection domain so that the operating system service can access privileged data structures and execute privileged instructions. However, a typical application that is using precise CPU time accounting in accordance with the present invention needs only very rare access to operating system services.

In accordance with embodiments of the present invention, the following exemplary services (described using C syntax) may be provided by system libraries to more efficiently implement CPU time accounting than the operating system services:

```
/* Compute the utilization represented by a single task's cpu time
   allotment within the specified deadline as a proportion of a single SMT
   Thread's full processing capability. For example, a CPUTime allotment
   of
   5 ms with a deadline of 20 ms represents a utilization of 0.25. Application
   code uses this service to calibrate comparisons between CPU time values
   and WallClockMicroseconds values. */
float utilization (CPUTime allotment, WallClockMicroseconds deadline) {
    /* Implementation depends on characteristics of the underlying
       hardware. By way of example, the implementation shown here
       corresponds to a configuration comprised of 4 SMT Threads running
       on each core, with a SPURR increment frequency of 512 MHz. Each
       SPURR tick is delivered to only one of the 4 SMT Threads. Assume
       the SPURR ticks are distributed uniformly between the SMT Threads.
       So each SMT Thread receives 128,000,000 ticks per second, or 1 tick
       every 7.8125 ns. */
    return (float) (allotment * 0.0078125) / deadline;
}
/* Determine how much CPU time has been consumed by the currently
   running task. */
CPUTime accumulation ( ) {
    /* Assume builtin_gtur returns the result of executing the gtur
       instuction. */
    return builtin_gtur ( );
}
/* Determine how much CPU time remains in the current operating
   system allotment. */
CPUTime remainingAllotment ( ) {
    /* Assume builtin_gtura returns the result of executing the gtura
       instuction. */
    return builtin_gtura ( ) - builtin_gtur ( );
}
/* Each task may set one alarm to interrupt itself after a particular amount
   of additional CPU time has been consumed. This function reports the
   absolute CPU time value at which the alarm will be triggered for the
   current task. The application program uses a service to register a handler
   that will be invoked at the appropriate alarm time. */
CPUTime alarmTime ( ) {
    /* Assume builtin_gtaua returns the result of executing the gtaua
```

```
   instuction. */
   return builtin_gtaua ( );
}
/* Set the alarm time for this task to the specified alarm time. This returns
the number of cpu time units between the alarm time and the current time.
If the value returned is negative, this may identify a race that was resolved
unfavorably: before the alarm for time X had been properly communicated
to the underlying hardware, time X already passed. Sometimes, it is
desirable to intentionally set an alarm time in the past. This has the effect
of turning off the alarm. */
long int setAlarm (CPUTime alarm_time) {
   /* Assume builtin_staua executes the staua instuction. */
   builtin_staua (alarm_time);
   return builtin_gtaua ( ) - builtin_gtur ( );
}
```

Continuing the example above, the implementation of the services may use certain existing operating system capabilities. For example, when a time-critical task is first created, the following information is remembered about its configuration:

```
/* The type of task that this is. */
enum TaskType { OneShot, Periodic, Ongoing, NonCritical } task_flavor;
/* The CPU time allotment each time this task is expected to run. */
CPUTime allotment;
/* The deadline for completion of this task, each time it is expected to
run.
   If task_flavor is Periodic or Ongoing, deadline is the same as period. */
WallClockMicroseconds deadline;
```

In addition to the information ordinarily maintained by an operating system to describe the state of each task, in accordance with embodiments of the present invention the following information which is associated with each task's internal description is saved and restored with each task context switch:

```
/* The CPU time consumed by this task, as reported by the gtur
   instruction. */
CPUTime user_cpu_time;
/* The thread application alarm time for this task, as reported by the gtaua
   instruction. */
CPUTime application_utilization_alarm;
/* The thread allotment alarm time for this task, as reported by the gtura
   instruction. */
CPUTime thread_utilization_allotment_timeout;
```

Each SMT thread may have its own task scheduler. The thread scheduler for each SMT thread repeatedly finds the highest priority task that is ready to run and dispatches this task for execution. In a task scheduler in accordance with embodiments of the present invention, time-critical tasks are automatically treated as having higher priority than all non-critical tasks. Among time-critical tasks, tasks that have shorter deadlines are treated as having higher priority than tasks that have longer deadlines. For purposes of this discussion, a periodic task's period is the same as its deadline.

Traditionally, a dispatched task runs until it blocks on an I/O or synchronization request, until some other task with higher priority becomes ready to run, or until the end-of-time-slice count-down timer interrupts the task's execution. In accordance with embodiments of the present invention, when a time-critical task is dispatched, the values of the SPURT, SPURIAT, and SPURIOS registers are all restored from the task's saved state. If subsequently the SPURIOS interrupt occurs before the traditional time slice tick, the task is taken off a ready list until such time as it is granted another allotment of CPU time. If the SPURIOS-interrupted task was periodic, rather than saving its current instruction and stack pointers, the operating system restores the task's saved instruction and stack pointers to their initial values so that the periodic task will restart when its CPU time allotment is replenished. Whenever a thread is preempted by a higher priority thread, the current values of the SPURT, SPURIOS, and SPURIAT registers are saved as part of the suspended thread state. Whenever a thread is blocked due to an I/O or synchronization request, the current values of the SPURT, SPURIOS, and SPURIAT registers are saved as part of the suspended thread state.

For further explanation, FIG. 8 sets forth a flow chart illustrating a further exemplary method for precise accounting of processor time for multi-threaded time-critical applications according to embodiments of the present invention that includes an example execution of an interrupt service routine (ISR) by the OS, in which the time allotment of a thread is maintained using the special purpose registers 701, 703, 705.

FIG. 8 illustrates, by way of example and not limitation, a sample usage of the above-described instructions by an ISR. Upon entry to an ISR figuratively named interrupt_service_routine, the CPU time accumulation changes from the running application thread to the associated ISR and the CPU time budget enforcement countdowns for the running application thread are suspended. This is reversed upon return from the ISR.

For this example, assume that SPURR increments once per instruction executed. To simplify the examples, the CPU Time that is typically consumed during the transfer of control between the running application code and entry to the interrupt service routine is not accounted for here. Besides transferring control, it is also necessary to change the protection domain from user space to system space. These additional costs can be modeled by making adjustments to the values of the ISR_PROLOGUE_CPU_TIME and ISR_EPILOGUE_CPU_TIME symbolic constants that are referenced below. The time required to execute the code from entry into the ISR at 801 through execution of the stur instruction at 806 is determined to be ISR_PROLOGUE_CPU_TIME. For purposes of illustration, assume upon entry to the interrupt_service_routine that the special purpose registers SPURR, SPURT, SPURIAT, and SPURIOS contain the following values:

| SPURR   | 1,000  |
|---------|--------|
| SPURT   | −382   |
| SPURIAT | 1,481  |
| SPURIOS | 5,382  |

The value held in the SPURIAT register indicates that an application requested CPU time enforcement limit will be delivered in 481 (calculated as 1,481−1,000) SPURR ticks. The value held in the SPURIOS register indicates than this application thread's current CPU time allotment expires in 4,382 (calculated as 5,382−1,000) SPURR ticks. At 801, interrupt_sevice_routine performs the ISR prologue the same as if there was no CPU time accounting.

Since application threads are free to directly set the value of the SPURIAT register without coordinating with the operating system, the operating system does not know the current value of this register without querying it. At instruction 802, the instruction gtaua $r_y$ is performed to obtain the value of the SPURIAT register. The value fetched into $r_y$ is 1,099 (calculated from 1,481+−382).

At instruction 803 current_thread->application_utilization_alarm is set to save the value of the SPURIAT register. Note that the operating system does not need to save the value of the SPURIOS register at this time. The value of the SPURIOS register was set previously by the operating system when the operating system dispatched this thread for execution. The operating system remembers the previously set SPURIOS value in the thread's thread utilization allotment timeout variable.

At instruction 804, $r_x$ is set to this_ISR->system_cpu_time. Thus, $r_x$ holds the value of system_cpu_time that had been consumed during previous executions of this interrupt_service_routine. Suppose, for purposes of illustration, that the value held in the this_ISR->system_cpu_time variable is 10,831. Suppose further that the known value of ISR_PROLOGUE_CPU_TIME is 198, which is the expected cost of executing the code that starts at 801 and ends following instruction 805.

At instruction 805, $r_z$ is set to $r_x$+ISR_PROLOGUE_CPU_TIME. Thus, in this example, $r_z$=11,029 (calculated as 10,831+198). For purposes of illustration, assume exactly that many cycles were consumed in executing from the entry point to the end of instruction 805. Accordingly, the values of the special purpose registers become:

| | |
|---|---|
| SPURR | 1,198 |
| SPURT | −382 |
| SPURIAT | 1,481 |
| SPURIOS | 5,382 |

At instruction 806, the operation stur $r_y$, $r_z$ is performed. Immediately following execution of instruction 806, $r_y$ holds 1198−382=816. SPURT holds 9,831=11,029−1198. Accordingly, the values of the special purpose registers at the end of instruction 806 are:

| | |
|---|---|
| SPURR | 1,199 |
| SPURT | 9,831 |
| SPURIAT | 1,481 |
| SPURIOS | 5,382 |

Note that stur is a privileged instruction. Since interrupt service routines are considered to be part of the operating system, this code is allowed to execute the stur instruction.

At instruction 807, $r_z$ is set to $r_y$−ISR_PROLOGUE_CPU_TIME. Thus, $r_z$ holds 618 (calculated from 816−198).

At instruction 808, current_thread->user_cputime is set to the value of $r_z$. In this example, the value stored to current_thread->user_cpu_time is 618. Note that this is the amount of CPU time that the application had consumed upon entry to the interrupt_service_routine. Had the current thread's utilization of resources been queried immediately upon entry into the interrupt service routine, the gtur instruction would have reported 618 (as calculated from SPURR (1,000)+ SPURT (−382)).

At instruction 809, the instruction stura $r_x$ is performed to effectively disable enforcement of thread utilization allotment. At instruction 810, the instruction staua $r_x$ is performed to effectively disable thread application utilization alarm. Here, the stura and staua instructions at 809 and 810 are setting these timeouts to occur in the "recent past," which is to effectively disable these timeouts. At this point, the values of the special purpose registers become:

| | |
|---|---|
| SPURR | 1,205 |
| SPURT | 9,831 |
| SPURIAT | 1,000 |
| SPURIOS | 1,000 |

At 811, the ISR checks for pending interrupts. While executing an interrupt service routine, nested interrupts are inhibited. Any CPU time interrupts raised during execution of the interrupt service routine prologue are to be ignored. If a CPU time allotment interrupt has been triggered while this ISR was executing its prologue and the requested time at which that interrupt was supposed to be raised is less than the value just stored to current_thread->user_cpu_time (in this example, 618), then the current_thread->thread_utilization_allotment and/or current_thread->application_utilization_alarm is set to $r_z$+1. Otherwise, these values are left unchanged. When the current application thread resumes, the thread's SPURT register will be configured to replay the time span that began upon entry into the ISR. This will cause any alarm signals accidentally delivered during execution of the ISR's prologue to be raised again when the thread is resumed.

At 812, the interrupt is serviced. This may have the side effect of changing the selection of current_thread. If the selection of current_thread is changed, this will affect the values of current_thread->user_cpu_time at instruction 813, current_thread->thread_utilization_allotment_timeout at instruction 817, and current_thread->application_utilization_alarm at instruction 819.

At 813, $r_x$ is set to current_thread->user_cpu_time. Assume for illustrative purposes that the selection of current_thread has not changed. Thus, $r_x$ receives the value saved at instruction 808 above, which is 618.

At 814, $r_y$ is set to $r_x$−ISR_EPILOGUE_CPU_TIME. Subtract ISR_EPILOGUE_CPU_TIME from the current_thread's user_cpu_time in anticipation of charging this amount of system CPU time to the user thread during execution of the code ranging from instruction 816 to the end of the ISR epilogue at 822. Assume for purposes of illustration that the CPU time consumed during execution of instructions 807 through 814 is 318. Thus, following execution of instruction 814, the SPURR register holds 1,199+318=1,517. Assume that the known cost of executing the interrupt service routine's epilogue from instruction 815 through 812 (ISR_EPILOGUE_CPU_TIME) is 203. Thus, $r_y$ is assigned the value 618−203=415. At this point, the special purpose registers become:

| | |
|---|---|
| SPURR | 1,517 |
| SPURT | 9,831 |
| SPURIAT | 1,000 |
| SPURIOS | 1,000 |

At 815, the operation stur $r_z$, $r_y$ is performed. Following this instruction, $r_z$ holds 11,348 (calculated as 1,517+9,831) and the SPURT register is overwritten with −1,102 (calculated from 415−1,517). Thus, the special purpose registers become:

| | |
|---|---|
| SPURR | 1,518 |
| SPURT | −1,102 |
| SPURIAT | 1,000 |
| SPURIOS | 1,000 |

At 816, this_ISR->system_cpu_time is set to $r_z$+ISR_EPILOGUE_CPU_TIME. Here, it is assumed that ISR_EPILOGUE_CPU_TIME equals 203. It is further assumed that this interrupt service routine does not trigger a context switch, so the same state that was saved above is restored. Thus, this_ISR->system_cpu_time is saved with the value 11,551 (calculated as 11,348+203). This represents 720 units of CPU time consumed in this most recent execution of the interrupt service routine. Remember that the value of this_ISR->system_cpu_time when fetched at instruction 804 was 10,831, which is 720 smaller than its new value of 11,551.

At 817, $r_x$ is set to current_thread->thread_utilization_allotment_timeout.

At 818, the operation stura $r_x$ is performed, restoring the SPURIOS register to represent the same time relative to the current thread's CPU time consumption that it held upon entry into the interrupt service routine.

At 819, $r_x$ is set to current_thread->application_utilization_alarm. This holds value 1,099, which was saved at instruction 802.

At 820, the operation staua $r_x$ is performed, restoring the SPURIAT register to represent the same time relative to the current thread's CPU time consumption that it held upon entry into the interrupt service routine. At this point, the special purpose registers hold the following values:

| SPURR | 1,523 |
|---|---|
| SPURT | −1,102 |
| SPURIAT | 2,201 |
| SPURIOS | 6,102 |

At 821, the epilogue checks once again for spurious CPU time interrupts that might be pending and explicitly ignores them. It is possible, though very unlikely, that a CPU time interrupt might be erroneously triggered between instructions 815, at which point the SPURT register has been adjusted to represent the application thread's frame of reference and instruction 820, at which time the SPURIOS register's contents has been adjusted to the same application thread's frame of reference. At 822, the OS performs ISR epilogue as if no precise CPU time accounting were being performed.

Upon return from the interrupt service routine, the application thread is resumed with SPURR value 1,720=1,517+203. This represents a gtur value of 618=1,720+−1,102, which is the same gtur value that the thread held when it was originally preempted by the interrupt service routine. Note that an application CPU time alarm is scheduled to occur in 481 (calculated as 2,201−1,720) SPURR cycles and the CPU allotment expires in 4,382 (calculated from 6,102−1,720) SPURR cycles. These values match the values that were held upon entry into the interrupt service routine. Upon return from the interrupt service routine, the values held in special purpose registers are as shown below:

| SPURR | 1,720 |
|---|---|
| SPURT | −1,102 |
| SPURIAT | 2,201 |
| SPURIOS | 6,102 |

Enabling precise CPU time accounting requires extra instructions on entry and exit of each system call, and in the prologue and epilogue of interrupt handlers. This will slightly degrade overall performance. On the other hand, having more precise control over the amounts of CPU time dedicated to particular tasks will for many applications significantly improve overall service quality because CPU cycles are not consumed in producing results that arrive too late to provide value and because the system so configured can do a better job of arranging to complete more time-critical tasks before the deadlines for their results have already passed. An added benefit is that performance engineers have more precise information on which to base engineering trade-off decisions.

Exemplary embodiments of the present invention are described largely in the context of a fully functional computer system for precise accounting of processor time for multi-threaded time-critical applications. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of processor time accounting for a thread executing on a processor in a multi-threaded environment, the method comprising:
    receiving from an operating system an allotment of time for use, by the thread, of the processor;
    performing, by the thread, timed computations using the processor;
    determining an amount of time used by the thread based on a thread utilization counter that is initialized by the operating system and is incremented in proportion to the number of machine cycles executed by the thread, wherein the determination is made through a user-level library function call; and
    obtaining an amount of time remaining in the allotment of time for use by the thread by comparing the thread utilization counter to a current processor time allotment limit value through a user-level library function call.

2. The method of claim 1 further comprising:
    setting an alarm to trigger at a time that is less than the allotment of time through a user-level library function call;
    performing timed computations using the processor;
    finishing the timed computations before the alarm triggers;
    turning off the alarm through a user-level library function call; and
    determining whether additional computations can be completed in the time remaining in the allotment of time.

3. The method of claim 1 further comprising:
setting an alarm to trigger at a time that is less than the allotment of time through a user-level library function call;
performing timed computations using the processor;
detecting the alarm;
interrupting the timed computations; and
determining whether additional computations can be completed in the time remaining in the allotment of time.

4. The method of claim 1 further comprising:
setting an alarm to trigger at a time that is less than the allotment of time through a user-level library function call;
performing timed computations using the processor;
obtaining an amount of time remaining before the alarm will trigger through a user-level library function call;
determining that the timed computations cannot be completed before the alarm is triggered;
abandoning the timed computations;
turning off the alarm through a user-level library function call; and
determining whether additional computations can be completed in the time remaining in the allotment of time.

5. The method of claim 1 further comprising:
comparing the amount of time remaining in the allotment of time against the time required to perform additional computations;
determining that are no additional computations to be performed within the time remaining in the allotment time;
saving a context of the thread; and
yielding time remaining in the allotment of time to the operating system.

6. The method of claim 1 wherein a rate at which the thread utilization counter is incremented is adjusted in proportion to dynamic adjustments to an underlying processor clock frequency.

7. The method of claim 1 further comprising:
receiving an interrupt from the operating system;
saving a thread context; and
preserving the time remaining in the allotment of time granted.

8. An apparatus for processor time accounting for a thread executing in a multi-threaded environment, the apparatus comprising a computer processor, a computer memory operatively coupled to the computer processor, the computer memory having disposed within it computer program instructions that, when executed by the computer processor, cause the apparatus to carry out the steps of:
receiving from an operating system an allotment of time for use, by the thread, of the processor;
performing, by the thread, timed computations using the processor;
determining an amount of time used by the thread based on a thread utilization counter that is initialized by the operating system and is incremented in proportion to the number of machine cycles executed by the thread, wherein the determination is made through a user-level library function call; and
obtaining an amount of time remaining in the allotment of time for use by the thread by comparing the thread utilization counter to a current processor time allotment limit value through a user-level library function call.

9. The apparatus of claim 8 further comprising:
setting an alarm to trigger at a time that is less than the allotment of time through a user-level library function call;
performing timed computations using the processor;
finishing the timed computations before the alarm triggers;
turning off the alarm through a user-level library function call; and
determining whether additional computations can be completed in the time remaining in the allotment of time.

10. The apparatus of claim 8 further comprising:
setting an alarm to trigger at a time that is less than the allotment of time through a user-level library function call;
performing timed computations using the processor;
detecting the alarm;
interrupting the timed computations; and
determining whether additional computations can be completed in the time remaining in the allotment of time.

11. The apparatus of claim 8 further comprising:
setting an alarm to trigger at a time that is less than the allotment of time through a user-level library function call;
performing timed computations using the processor;
obtaining an amount of time remaining before the alarm will trigger through a user-level library function call;
determining that the timed computations cannot be completed before the alarm is triggered;
abandoning the timed computations;
turning off the alarm through a user-level library function call; and
determining whether additional computations can be completed in the time remaining in the allotment of time.

12. The apparatus of claim 8 further comprising:
comparing the amount of time remaining in the allotment of time against the time required to perform additional computations;
determining that there are no additional computations to be performed within the time remaining in the allotment time;
saving a context of the thread; and
yielding time remaining in the allotment of time to the operating system.

13. The apparatus of claim 8 wherein a rate at which the thread utilization counter is incremented is adjusted in proportion to dynamic adjustments to an underlying processor clock frequency.

14. The apparatus of claim 8 further comprising:
receiving an interrupt from the operating system;
saving a thread context; and
preserving the time remaining in the allotment of time granted.

15. A computer program product for processor time accounting for a thread executing in a multi-threaded environment, the computer program product disposed upon a non-transitory computer readable medium, the computer program product comprising computer program instructions that, when executed, cause a computer to carry out the steps of:
receiving from an operating system an allotment of time for use, by the thread, of the processor;
performing, by the thread, timed computations using the processor;

determining an amount of time used by the thread based on a thread utilization counter that is initialized by the operating system and is incremented in proportion to the number of machine cycles executed by the thread, wherein the determination is made through a user-level library function call; and obtaining an amount of time remaining in the allotment of time for use by the thread by comparing the thread utilization counter to a current processor time allotment limit value through a user-level library function call.

16. The computer program product of claim 15 further comprising:

setting an alarm to trigger at a time that is less than the allotment of time through a user-level library function call;

performing timed computations using the processor;

finishing the timed computations before the alarm triggers;

turning off the alarm through a user-level library function call; and determining whether additional computations can be completed in the time remaining in the allotment of time.

17. The computer program product of claim 15 further comprising:

setting an alarm to trigger at a time that is less than the allotment of time through a user-level library function call;

performing timed computations using the processor;

detecting the alarm;

interrupting the timed computations; and determining whether additional computations can be completed in the time remaining in the allotment of time.

18. The computer program product of claim 15 further comprising:

setting an alarm to trigger at a time that is less than the allotment of time through a user-level library function call;

performing timed computations using the processor;

obtaining an amount of time remaining before the alarm will trigger through a user-level library function call;

determining that the timed computations cannot be completed before the alarm is triggered;

abandoning the timed computations;

turning off the alarm through a user-level library function call; and determining whether additional computations can be completed in the time remaining in the allotment of time.

19. The computer program product of claim 15 further comprising:

comparing the amount of time remaining in the allotment of time against the time required to perform additional computations;

determining that there are no additional computations to be performed within the time remaining in the allotment time;

saving a context of the thread; and yielding time remaining in the allotment of time to the operating system.

20. The computer program product of claim 15 wherein a rate at which the thread utilization counter is incremented is adjusted in proportion to dynamic adjustments to an underlying processor clock frequency.

* * * * *